(12) United States Patent
Loomis et al.

(10) Patent No.: US 7,860,664 B2
(45) Date of Patent: Dec. 28, 2010

(54) SYSTEM AND METHOD FOR SELF-CONTAINED STRUCTURAL HEALTH MONITORING FOR COMPOSITE STRUCTURES

(75) Inventors: Kevin S. Loomis, Wichita, KS (US); Farhad J. Tadayon, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 71 days.

(21) Appl. No.: 12/371,046

(22) Filed: Feb. 13, 2009

(65) Prior Publication Data

US 2009/0259411 A1 Oct. 15, 2009

Related U.S. Application Data

(60) Provisional application No. 61/045,153, filed on Apr. 15, 2008.

(51) Int. Cl.
*G01B 5/28* (2006.01)
(52) U.S. Cl. ......................................................... 702/35
(58) Field of Classification Search .................. 702/34, 702/35, 36, 183, 184, 185
See application file for complete search history.

(56) References Cited

U.S. PATENT DOCUMENTS

| | | | |
|---|---|---|---|
| 5,970,393 A * | 10/1999 | Khorrami et al. | ............ 455/129 |
| 6,260,415 B1 | 7/2001 | Goebel et al. | |
| 6,443,012 B2 | 9/2002 | Beardmore | |
| 7,117,742 B2 | 10/2006 | Kim | |
| 7,197,931 B2 | 4/2007 | Kim | |
| 7,246,521 B2 | 7/2007 | Kim | |
| 7,276,703 B2 | 10/2007 | Berkcan et al. | |
| 7,281,428 B2 | 10/2007 | Kim | |
| 7,283,806 B2 | 10/2007 | Masquelier | |
| 7,286,964 B2 | 10/2007 | Kim | |
| 7,322,244 B2 | 1/2008 | Kim | |
| 2005/0075846 A1* | 4/2005 | Kim | ............................. 703/1 |

(Continued)

FOREIGN PATENT DOCUMENTS

WO   WO 2007/018845   2/2007

OTHER PUBLICATIONS

DoD STTR Program Phase I Selections for FY03; http://www.dodsbir.net/selections/sttr1_03.htm; Mar. 3, 2008; p. 14.

(Continued)

*Primary Examiner*—Drew A Dunn
*Assistant Examiner*—Stephen J Cherry
(74) *Attorney, Agent, or Firm*—Hovey Williams LLP (57) ABSTRACT

A system and method for structural health monitoring (SHM) of a physical structure, such as an aircraft component. The system may comprise a central data acquisition module and a plurality of wireless, self-contained sensor wafers bonded to a surface of the physical structure. The central data acquisition module and the sensor wafers may be communicably coupled in a hierarchical order. If any of the sensor wafers detects a structural fault, it may be stored in a memory of the central data acquisition module for retrieval by maintenance personnel. If one or more of the sensor wafers malfunctions, the central data acquisition module may reconfigure the hierarchical order in which the sensor wafers communicate to exclude the malfunctioning sensor wafer or wafers. The sensor wafers may include a sensor, circuitry, a wireless antenna, and a power source.

16 Claims, 4 Drawing Sheets

U.S. PATENT DOCUMENTS

| | | |
|---|---|---|
| 2007/0056375 A1 | 3/2007 | Akdeniz et al. |
| 2007/0100582 A1 | 5/2007 | Griess et al. |
| 2007/0116403 A1 | 5/2007 | Blemel |
| 2007/0265808 A1 | 11/2007 | Kim |
| 2007/0266788 A1 | 11/2007 | Kim |
| 2008/0036617 A1 | 2/2008 | Arms et al. |
| 2008/0255781 A1 * | 10/2008 | Beard et al. .................. 702/59 |

OTHER PUBLICATIONS

Nasa 2004 SBIR Phase 2 Soliciataion; http://www.sbir.nasa.gov/SBIR/abstracts/04-2.html; Mar. 3, 2008; p. 69.

Wireless Strain Sensing Networks; Steven W. Arms et al.; http://atlas-conferences.com/c/a/m/a/70.htm; Nov. 23, 2008.

* cited by examiner

SYSTEM AND METHOD FOR SELF-CONTAINED STRUCTURAL HEALTH MONITORING FOR COMPOSITE STRUCTURES

RELATED APPLICATIONS

This nonprovisional patent application claims priority benefit, with regard to all common subject matter, of earlier-filed U.S. provisional patent application titled "A Self-Contained Structural Health Monitoring System For Aircraft Composite Panels", Ser. No. 61/045,153, filed Apr. 15, 2008. The identified earlier-filed application is hereby incorporated by reference in its entirety into the present application.

BACKGROUND

1. Field

The present invention relates to structural health monitoring (SHM) of aircraft parts. More particularly, the present invention relates to wireless, self-contained sensors communicating hierarchically with a central data acquisition module for monitoring the structural health of a composite part.

2. Related Art

Detection of structural damage or deterioration of various aircraft components is critical to insuring the safety of all occupants and cargo on board. Historically, such detection has been done manually, but this is extremely time-consuming and often ineffective because many types of damage and/or deterioration is difficult to detect with the naked eye.

Automated, non-manual technologies for aircraft structural health monitoring (SHM) are often more efficient and effective than manual detection methods, but are presently in early stages of development. One known type of SHM system includes several independent piezoelectric sensors, glued or otherwise affixed to an aircraft structure such as a wing, and wired to a data acquisition box on-board the aircraft or connected through an electrical bus. These sensors may produce an electric signal in response to various stimuli, such as vibration, and the data acquisition box may store these signals for later processing or may process these signals itself to determine the structural health of an area of the aircraft structure adjacent to the sensor. However, because the sensors and wires are glued to the exterior of the aircraft structure, they are susceptible to damage.

For composite aircraft, these problems can be largely avoided by embedding the SHM hardware within the composite. However, studies have shown that sensors embedded within a composite laminate can cause resin buildup in the vicinity of the sensor, which can initiate cracking in the composite part. Studies have also shown that this predisposition to crack initiation can be minimized by punching out a pocket in the ply stack-up for the sensor. However, such pockets are difficult to manufacture and can decrease the stress allowed for a given composite part due to the cuts made in the fiber in the local area of each sensor.

Embedding the sensors in a composite part and connecting the grid of sensors together or to a central bus can also slow down the manufacturing process. For example, in an automated process such as fiber tow placement or filament winding, the fiber placement process would have to be halted several times to place sensors, make the appropriate connections, and verify that all connections were secure before continuing with the fiber placement. There also exists a risk that the subsequent tows would dislodge sensors or wires. Then, if a sensor is faulty, there is no simple way to remove and replace the embedded sensor without affecting the structural integrity of the composite part.

Additionally, routing and gluing wires and connectors around complex structures and systems can also be problematic. To solve this particular problem, another type of SHM system uses wireless sensors to communicate with the data acquisition box. However, some sensors are physically located at farther distances from the data acquisition box than others. Therefore, some sensors must send the wireless signal farther, causing those sensors to consume a greater amount of power. This need for power limits how small the batteries for such wireless sensors may be. Additionally, the farther that each wireless sensor must send a signal, the more likely it is that the signal may experience some type of interference.

Accordingly, there is a need for an improved method of monitoring the structural health of an aircraft part that does not suffer from the problems and limitations of the prior art.

SUMMARY

Various embodiments of the present invention provide a wireless, self-contained Structural Health Monitoring (SHM) system for monitoring the structural health of a structure, such as a composite aircraft part. The SHM system may have a central data acquisition module and a plurality of sensor wafers bonded to a bondable surface of the structure and capable of communicating with each other in a hierarchical communications structure. Specifically, the SHM system is capable of sensing when one of the sensor wafers fails, and reconfiguring other sensor wafers to monitor the failed sensor's region.

The central data acquisition module may comprise a processor and memory, and may be operable to send and receive wireless signals containing data associated with the structural health of a physical structure. The central data acquisition may store received data in the memory, along with pre-defined sensor wafer parameters and mapping information for instructing the sensor wafers about which other sensor wafers they should communicate with.

The sensor wafers may each comprise a sensor, circuitry, a wireless antenna, and a power source to power various components of the sensor wafer. The sensor may convert at least one of mechanical or thermal energy into an electrical signal, such that structural faults may be detected. The circuitry may be operable to receive and route data signals from its sensor, other sensor wafers, and the central data acquisition module to other sensor wafers or the central data acquisition module. The circuitry may also comprise internal memory for storing various data regarding the sensor wafer and the other sensor wafers with which it communicates.

The power source of each sensor wafer may be a battery or a power generation or power harvesting source for generating or collecting an electrical charge to power components of the sensor wafer. Additionally, at least one of the wireless antenna and the circuitry traces may be direct write (DW) deposited onto a carbon fiber ply or a fiberglass ply. Carbon fiber or fiberglass ply or other non-conductive substances may be used within the sensor wafers to create a buffer between conductive components that should not touch.

Furthermore, outer carbon fiber plies of the sensor wafers may be bonded to the surface of a composite part and bonded thereto via a composite curing process. Subsequently, the sensor wafers may be covered with an epoxy-based protective coating to shield them from environmental elements that may damage the sensor wafers. These and other important aspects of the present invention are described more fully in the detailed description below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

An embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
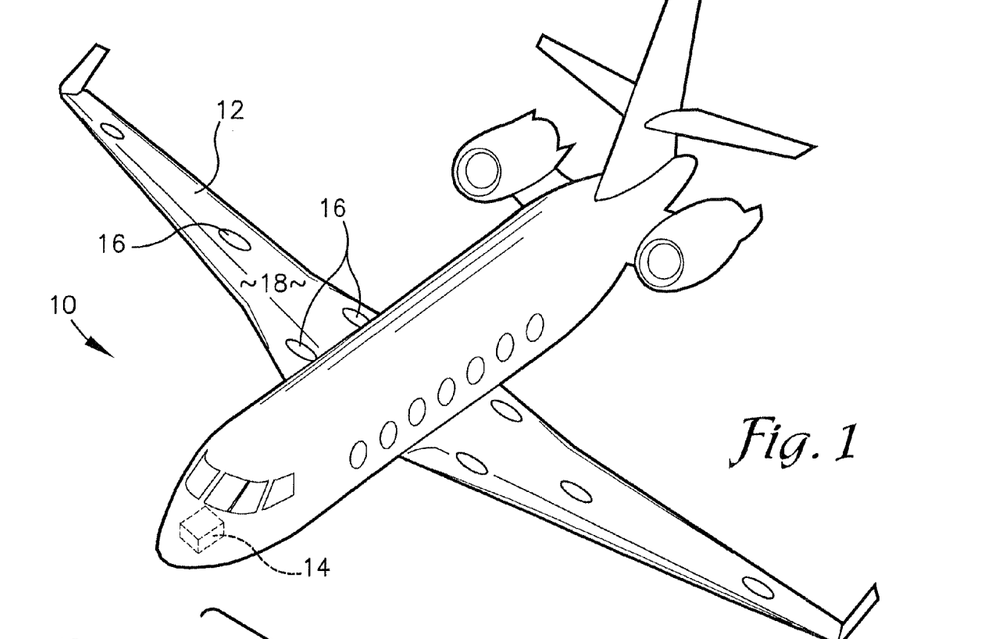
FIG. 1 is a schematic drawing of an aircraft with a structural health monitoring (SHM) system applied thereto.

As illustrated in FIG. 1, various embodiments of the invention provide a wireless, self-contained Structural Health Monitoring (SHM) system 10 for monitoring the structural health of at least one physical structure 12, such as composite parts of an aircraft. The SHM system 10 has a central data acquisition module 14 and a plurality of sensor wafers 16 bonded or otherwise attached to a surface 18 of the structure 12 and capable of communicating in a hierarchical structure with each other and with the central data acquisition module 14. Specifically, the SHM system 10 is capable of sensing when one of the sensor wafers 16 fails, and reconfiguring other sensor wafers 16 to monitor the failed sensor's region on the surface 18.

The central data acquisition module 14 may be mounted on or proximate to the bondable surface 18. For example, the central data acquisition module 14 may be located within an aircraft or may be attached in someway to the aircraft. The central data acquisition module 14 may be accessible by maintenance personnel for purposes of repair or to upload information to or download information from the central data acquisition module 14.

The central data acquisition module 14 may comprise a processor 20 and associated memory 22 for processing and/or storing a map or map data regarding the sensor wafers' hierarchical configuration, operational status, any data sent by the sensor wafers to the central data acquisition module, and pre-programmed responses to various types of data received by the data acquisition module.

The processor 20 may include any number of processors, controllers, integrated circuits, programmable logic devices, or other computing devices and resident or external memory for storing data and other information accessed and/or generated by the system 10. The processor 20 may be coupled with the sensor wafers 16, a display 24, the memory 22, an input device 26, and other components through wired or wireless connections, such as a data bus (not shown), to enable information to be exchanged between the various components.

The processor 20 may implement a computer program and/or code segments to perform the functions described herein. The computer program preferably comprises an ordered listing of executable instructions for implementing logical functions in the processor. The computer program can be embodied in any computer-readable medium for use by or in connection with an instruction execution system, apparatus, or device, and execute the instructions. In the context of this application, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semi-conductor system, apparatus, device or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The memory 22 may be integral with the system 10, integral with the processor 20, stand-alone memory, or a combination of both. The memory 22 may include, for example, removable and non-removable memory elements such as RAM, ROM, flash, magnetic, optical, USB memory devices, and/or other conventional memory elements.

The memory 22 may store various data associated with the operation of the system 10, such as the computer program and code segments mentioned above, or other data for instructing the processor and system 10 elements to perform the steps described herein. Further, the memory 22 may store data regarding the configuration, location, and status of each sensor wafer 16 within the system 10 as well as information about the data sensed by each sensor wafer 16, acceptable thresholds for various types of data received, reconfiguration instructions for various types of sensor wafer malfunctions, etc. The various data stored within the memory 22 may also be associated within one or more databases to facilitate retrieval of the information.

The input device 26 may permit a user to operate the system 10 and may enable users, third parties, or other devices to share information with the processor. The input device 26 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the input device 26 may comprise wired or wireless data transfer elements such as a removable memory including the memory, data transceivers, etc., to enable the user and other devices or parties to remotely interface with the system 10.

The input device 26 may be operable to provide various information to the user utilizing the display or other visual or audio elements such as a speaker. Thus, the input device 26 enables the user and system 10 to exchange information relating to the system 10, including mapping data and parameters regarding the hierarchical sensor wafers' configuration, acceptable thresholds for various types of data, reconfiguration instructions for various types of sensor wafer malfunctions, etc.

The display 24 may be optionally coupled with the processor 20 and may be operable to display various information corresponding to the system 10 and its sensor wafers 16. For example, the display 24 may display user-entered information as well as data regarding the status of each sensor wafer 16, data received from each sensor wafer 16, sensor wafer configuration, etc. The display 24 may comprise conventional black and white, monochrome, or color display elements including CRT, TFT, LCD, and/or plasma display devices. Additionally, the display 24 may be integrated with the input device 26, such as in embodiments where the display 24 is a touch-screen display to enable the user to interact with it by touching or pointing at display areas to provide information to the SHM system 10.

Figure 2:
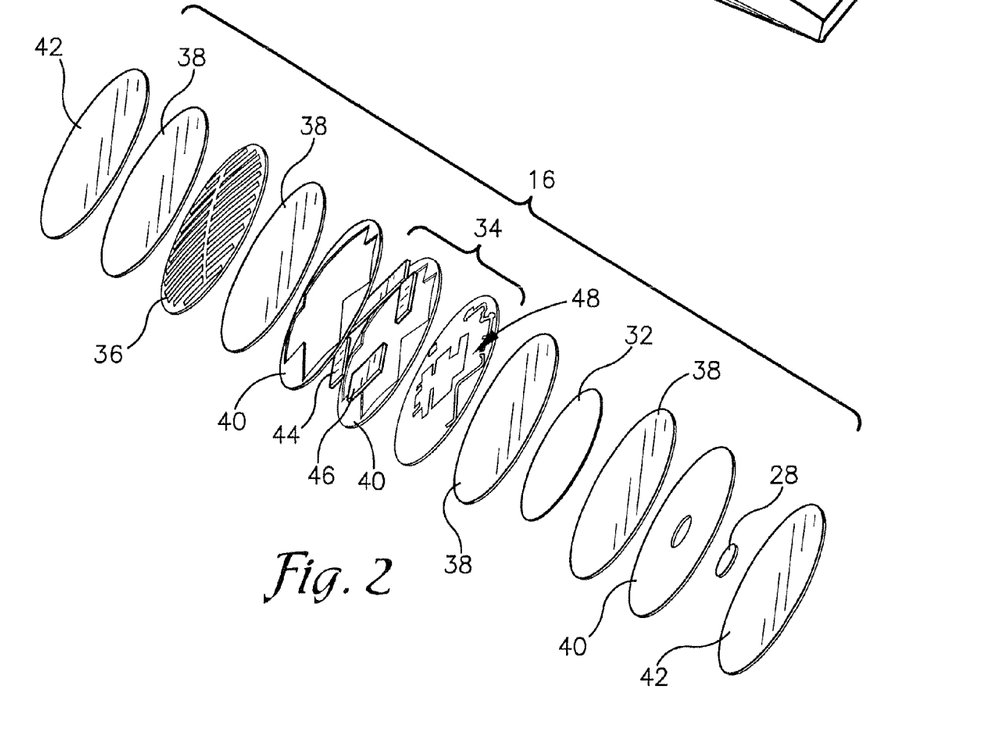
FIG. 2 is an exploded view of one of a plurality of sensor wafers of the SHM system illustrated in FIG. 1.

The sensor wafers 16 may be of any shape or size as required for a given application. In various embodiments of the invention, the sensor wafers may each be less than 20 cubic inches in volume, and may preferably be less than 10 cubic inches in volume. Additionally, the sensor wafers 16 may preferably be shaped to efficiently adhere to complex contour surfaces, such as contoured aircraft structure, without interfering with adjacent structure. The sensor wafers 16 may each be disc-shaped and thin. For example, the wafers may be approximately 1 to 2 inches in diameter and approximately 0.25 inches thick. The edges of each of the sensor wafers 16 may also be tapered to form a smooth seam between the edges of the sensor wafers 16 and the surface 18. At least some of the sensor wafers 16 may also be customized in shape to match or mirror a complex contour of the surface 18. Each of the sensor wafers 16 may comprise a sensor 28 for sensing various physical conditions of the surface 18, a power source 32, circuitry 34, a wireless antenna 36, and isolation plies 38, 40, 42 for separating various conductive components of the sensor wafers 16.

Each sensor 28 may comprise any sensing device operable to sense physical conditions. For example, the sensor 28 may be operable to sense at least one of heat, vibration, pressure, acceleration, and force. The sensor 28 may react to at least one of such physical conditions by producing an electrical signal. Examples of such sensors may include piezoelectric (PTZ) sensors, Fiber Bragg Gratting (FBG) sensors, carbon nanotube film, etc.

The power source 32 may be operable to store and/or produce power for the various sensor wafer components, and is therefore electrically coupled with at least one of the circuitry 34 and the sensor 28. Preferably, the power source 32 may be able to withstand high temperatures and pressure generated in a conventional composite manufacturing autoclave process.

The power source 32 may be a battery, a power generation source, or a power harvesting source. As a power generation or power harvesting source, the power source 32 may produce or harvest electricity from physical stimulus, such as vibrations, or may be temperature-differential based, such as thermoelectric generators, etc. As a battery, the power source 32 may be any battery known in the art, such as a thin-film lithium-ion cell. Alternatively, the power source 32 may comprise a combination of any of a battery, a power generation source, and a power harvesting source.

The circuitry 34 may comprise an internal processor 44 having internal memory 46 and circuitry traces 48 or conductive lines allowing electricity to flow between electronic components of the sensor wafer 16. The internal processor 44 may include any number of processors, controllers, integrated circuits, programmable logic devices, or other computing devices and resident or external memory for storing data and other information accessed and/or generated by the sensor wafer 16. The internal processor 44 may implement a computer program and/or code segments to perform the functions described herein. The computer program may comprise an ordered listing of executable instructions for implementing logical functions in the internal processor. The computer program can be embodied in any computer-readable medium for use by or in connection with an instruction execution system, apparatus, or device, and execute the instructions.

The internal memory 46 may be integral with the sensor wafer 16, integral with the internal processor 44, stand-alone memory, or a combination of both. The internal memory 46 may include, for example, removable and non-removable memory elements such as RAM, ROM, flash, magnetic, optical, USB memory devices, and/or other conventional memory elements.

The internal processor 44 may be operable to perform on-board diagnostic procedures and to process and route data received to the appropriate sensor wafer 16 or to the central data acquisition module 14. The internal processor 44 may also be operable to perform fault detection for a portion of the structure 12 or surface 18 to which the sensor wafer 16 is attached and is monitoring. A structural fault of the structure 12 and/or surface 18 being monitored may include any weakening of the physical structure, excess stress or strain applied to the structure 12, an unexpected impact to the structure 12, the structure 12 or the surface 18 reaching a dangerous temperature, etc. For example, the internal memory 46 may store data regarding a healthy signature or baseline vibration pattern, and if the pattern sensed by the sensor does not match this baseline vibration pattern, then a structural fault is detected.

Additionally, if the internal processor 44 does not detect an expected signal from another sensor wafer, or receives an erroneous signal from another sensor wafer determined to be caused by an error unrelated to a structural fault of the structure, it may send a signal via the wireless antenna 36 to notify the central data acquisition module 14 as to the error and which sensor wafer 16 is faulty. Using this data, the central data acquisition module 14 may reconfigure the hierarchical structure and/or mapping data of the sensor wafers 16 so that sensor wafers near a faulty sensor wafer may take over monitoring the faulty sensor wafer's monitoring region.

The internal memory 46 may store various data associated with the operation of the sensor wafer 16, such as the computer program and code segments mentioned above, or other data for instructing the sensor wafer elements to perform the steps described herein. The various data stored within the internal memory 46 may also be associated within one or more databases to facilitate retrieval of the information.

Additionally, the internal memory 46 may store its own identification information as well as information regarding the sensor wafers 16 from which it is designated to receive data signals or to which it is designated to send data signals. For example, in a hierarchical structure, every entity in the organization, except one—the central data acquisition module 14, is subordinate to a single other entity. So, in various embodiments of the invention, sensor wafers 16 may serve as parent nodes, sending data signals to and receiving data signals from one or more child nodes designated by the central data acquisition module 14. Additionally, sensor wafers 16 may serve as child nodes that receive data signals from and send data signals to their designated parent node. So, each sensor wafer may have one "parent" sensor wafer, but multiple "child" sensor wafers.

Figure 3:
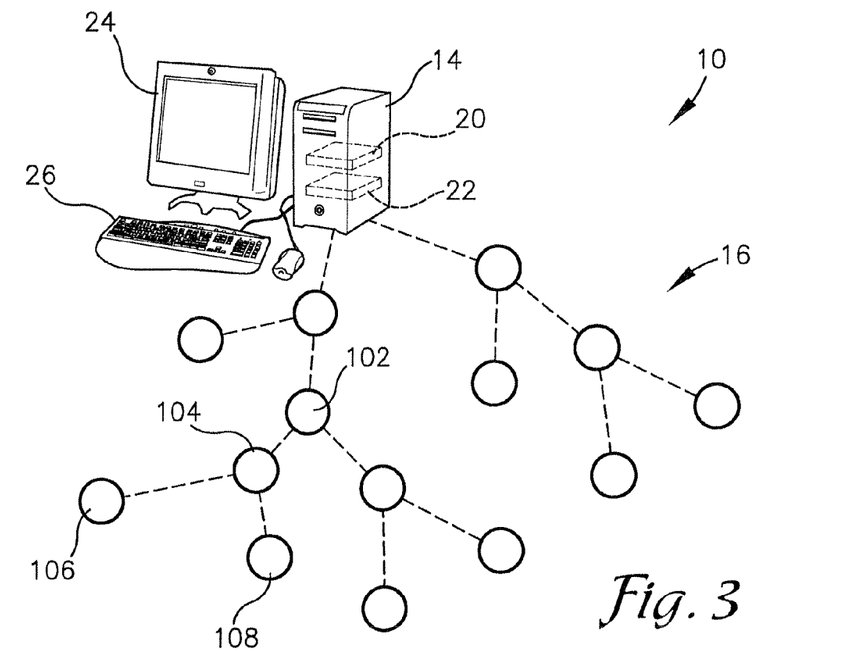
FIG. 3 is a schematic diagram of a hierarchical communications structure for the SHM system of FIG. 1.
Figure 4:
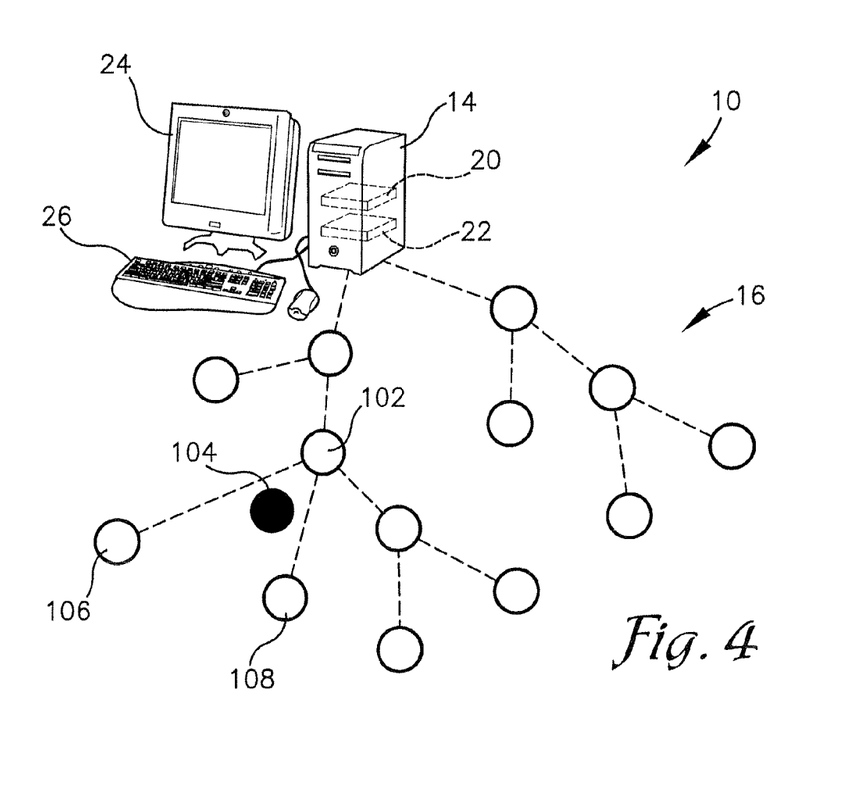
FIG. 4 is a schematic diagram of the hierarchical communications structure of FIG. 3, reconfigured to compensate for a faulty sensor wafer.

A hierarchical structure of sensor wafers is illustrated in FIGS. 3-4. For example, in FIG. 3, sensor wafers 106 and 108 are subordinate to sensor wafer 104. So data signals from the sensors 28 of sensor wafers 106, 108 are transmitted to the wireless antenna 36 of sensor wafer 104. For example, the data signals transmitted by sensor wafers 106, 108 may be encoded with an address so that sensor wafer 104 knows which sensor wafers sent a given data signal, and may ignore any signals not containing designated sensor wafer addresses. Additionally, sensor wafer 104 may transmit data to sensor wafers 106, 108 in a similar manner to communicate data from the central data acquisition module 14. Likewise, sensor wafer 104 is subordinate to sensor wafer 102. However, it should be noted that FIGS. 3-4 illustrate how the sensor wafers 16 may be communicably coupled, but the sensor wafers 16 may be physically arranged in any configuration on the surface 18 of the structure 12 being monitored.

The wireless antenna 36 may be communicably coupled with at least one of the internal processor 44, the internal memory 46, and the sensor 28. The antenna 36 may be operable to send and receive data signals to and from other sensor wafers 16 and the central data acquisition module 14.

The circuitry traces 48 and the wireless antenna 36 may be created using direct write (DW) plasma spray applied to a carbon fiber ply or any non-conductive surface capable of withstanding the pressure and heat generated in a conventional composite manufacturing autoclave process. DW typically includes depositing material in precise patterns, which may be laid out as a computer-aided-design (CAD) file. This CAD drawing may then be uploaded to an automation system driving DW manufacturing tools. Using a DW manufacturing process, these devices may be fabricated by spraying heated powders thru apertures directly onto surfaces, thereby creating components particle-by-particle.

The isolation plies 38-42 may be composite material or other types of non-conductive isolation layers operable to separate various conductive components. For example, as illustrated in FIG. 2, isolation plies may include intermediate isolation plies 38, such as those isolating the power source 32, as well as cutout plies 40 for components that may be coupled to each other and only require portions of the component to be isolated from an adjacent component. For example, the internal processor 44 and internal memory 46 in FIG. 2 are separated from the circuitry traces 48 by cutout plies 40. Furthermore, the outer portions of the sensor wafers 16 may be covered with outer plies 42.

At least a portion of the outer plies 42 of each of the sensor wafers 16 may be bonded to the surface 18 before, during, or after a composite curing process using any method known in the art such as co-curing, co-bonding, etc. By bonding the sensor wafers 16 to the surface of the structure 12, the strength of the structure 12 is not compromised, and if or when a sensing wafer 16 needs to be replaced, it will not impact the structure 12. This may ease the maintenance and replacement efforts and cost of the SHM system 10.

After the sensor wafers 16 are mounted on the surface of the structure, they may be covered with a protective cover or a protective coating to reduce or eliminate the environmental impact on the sensor wafer 16. The protective coating may be an epoxy-based coating for protecting the sensor wafers 16 without attenuating vibrational signals or heat to be detected by the sensor 28 from the surface 18 being monitored.

In use, the central data acquisition module 14 may communicate with the sensor wafers 16, and the sensor wafers 16 may communicate with each other in a hierarchical structure, as illustrated in FIGS. 3-4. The hierarchical structure may be stored as a map or map data in the memory 22 of the central data acquisition module 14, and may describe which sensor wafers 16 communicate with which other designated ones of the sensor wafers 16. As discussed above, the hierarchical structure may be a tree-like data structure, including child nodes and parent nodes, with the central data acquisition module 14 serving as the highest node of the hierarchy.

In a hierarchical manner, data signals from each child node may be relayed back from one parent node to another until it reaches the central data acquisition module 14. If a structural fault is detected by any of the sensor wafers 16, this may be recorded in the memory 22 of the central data acquisition module 14. For example, information stored in the memory 22 may include a type of signal detected, a significant change in the signal detected, what sensor wafer the signal originated from, and a time at which a structural fault was detected. In various embodiments of the invention, these faults may be analyzed remotely in real time or may be accessed later by maintenance personnel or another computing device for subsequent analysis to determine what maintenance or repairs, if any, may be required.

The central data acquisition module 14 may be programmed or configured to periodically check a status of each sensor wafer 16. If one of the sensor wafers 16 does not return a signal or returns an erroneous signal unrelated to fault detection, then the central data acquisition module 14 may reconfigure the map such that surrounding or subsequent sensor wafers 16 in the hierarchy may communicate with another parent wafer. For instance, the parent wafer and/or various child wafers of a defective sensor wafer may take over monitoring an area previously designated to be monitored by the defective wafer.

For example, as illustrated in FIG. 3, if the internal processor 44 of one of the sensor wafers 102 does not detect an expected signal from another sensor wafer 104 (a child node in this example), or receives an erroneous signal from the sensor wafer 104, the sensor wafer 102 may send a signal via its wireless antenna 36 to notify the central data acquisition module 14 of the error, including which sensor wafer 104 is defective. Using this data, the central data acquisition module 14 may reconfigure the hierarchical structure and/or mapping data of the sensor wafers 16, as shown in FIG. 4, so that the defective wafer 104 is no longer monitored as part of the SHM system.

Instead, sensor wafers near the defective sensor wafer 104, such as sensor wafers 106 and 108, may take over monitoring a region or area previously monitored by the faulty sensor wafer 104. With the reconfigured mapping data, the central data acquisition module 14 instructs the sensor wafer 102 to stop searching for a wireless signal from the defective sensor wafer 104, and to start searching for wireless signals from sensor wafers 106 and/or 108.

Note that FIGS. 3 and 4 illustrate a communications hierarchy only. The sensors may be physically bonded to the surface in any physical configuration required to monitor a particular surface of a particular structure. However, preferably the sensor wafers 16 are mapped to communicate with sensor wafers in a neighboring area of the surface 18, so that they do not need to transmit wireless signals very far, thereby saving on power used by the sensor wafers 16. Therefore, one of the benefits of a hierarchical communications structure for the sensor wafers 16 is that less signal strength is typically required for one sensor wafer to communicate with a neighboring sensor wafer than for all sensor wafers to communicate directly with the central data acquisition module 14, which may be nearby some sensor wafers 16 and far away from others.

Figure 5:
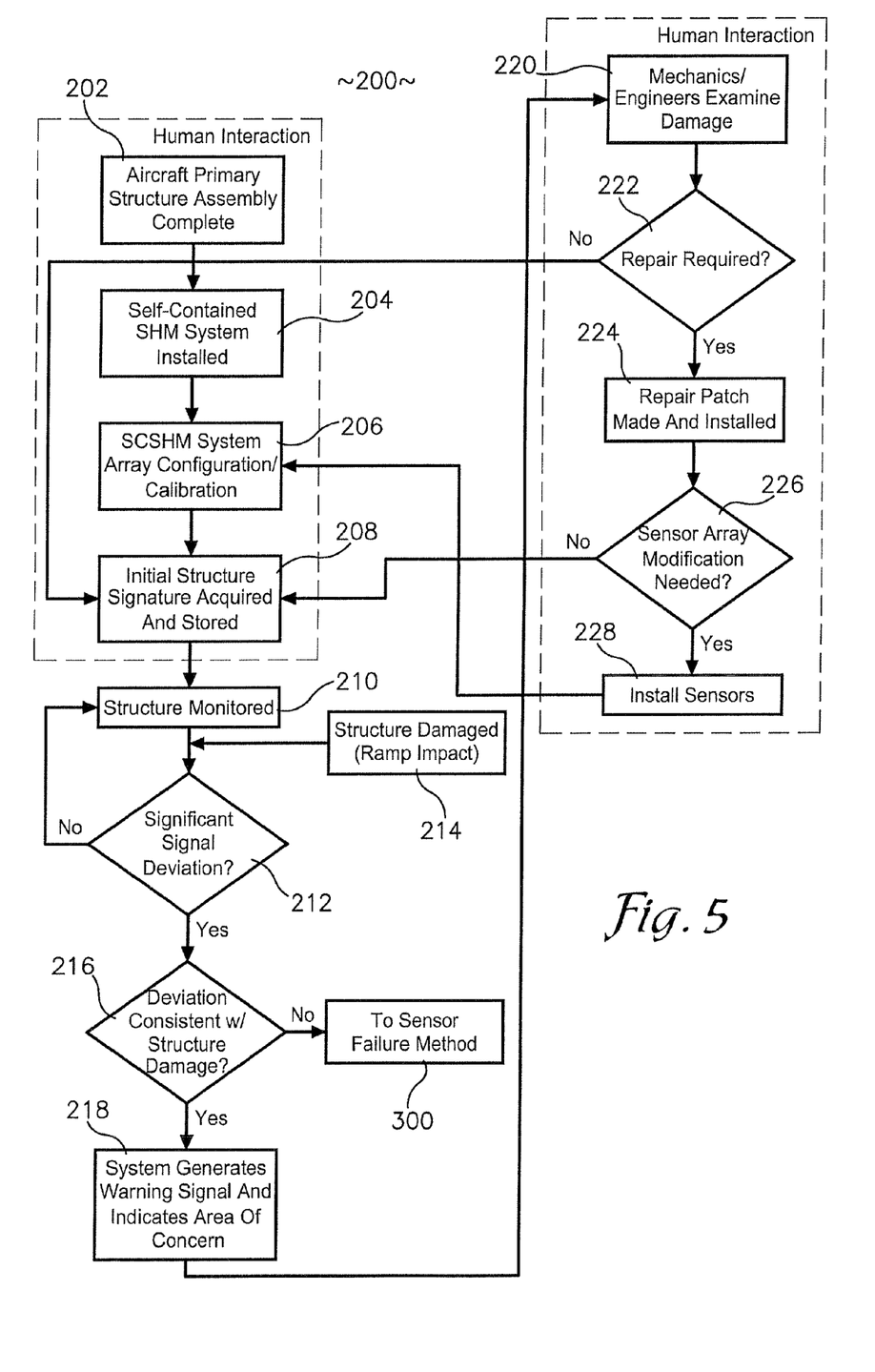
FIG. 5 is a flow chart depicting a method of monitoring an aircraft with the SHM system of FIG. 1.

FIG. 5 illustrates an exemplary method 200 of installing and using the SHM system 10 to detect the structural health of the physical structure 12. In this example, the physical structure 12 may be an aircraft. Step 202 depicts assembly of the physical structure 12. Step 204 depicts physical installation of the SHM system 10. Physical installation may comprise bonding the sensor wafers 16 to the physical structure 12. Step 206 depicts configuring and calibrating the SHM system. This step may involve programming into the central data acquisition module 14 which sensors wafers 16 are parent nodes, which sensor wafers 16 are child nodes, etc. Step 208 depicts acquiring and storing an initial structure signature, which may comprise obtaining a baseline signal for each sensor wafer 16 in its initial, undamaged state. Additionally, a user may program an acceptable range of deviation from the baseline signal obtained for each sensor wafer 16. Steps 202 through 208 may require user interaction to complete.

Step 210 depicts monitoring of the physical structure 12 by the SHM system 10. Step 212 depicts the SHM system 10 checking for significant signal deviation, such as a signal which is outside of the acceptable range of deviation. The SHM system 10 may check for signal deviation at set intervals of time or substantially continuously. If significant signal deviation has not occurred, the SHM system 10 continues to monitor the sensor wafers 16. Signal deviation may occur due to structure damage or ramp impact, as illustrated in step 214. If significant signal deviation does occur, the SHM system 10 may determine if the deviation is consistent with structure damage, as depicted in step 216.

If the signal deviation is consistent with structure damage, the SHM system 10 may generate a warning signal and indicate an area or areas of concern. Then mechanics and/or engineers may examine the damage, as in step 220, and determine if repair is required, as in step 222. If repair is not required, the initial structure signature or baseline signal may again be acquired and stored as in step 208, and the monitoring of the physical structure 12 may continue. If repair is required, a repair patch for the physical structure 12 may be made and installed, as depicted in step 224.

Following the installation of the repair patch, the engineer or mechanic may determine if configuration of the sensor wafers 16 needs modification, as depicted in step 226. The configuration of the sensor wafers 16 may need modification if any sensor wafers 16 are damaged or if the system is being upgrade to a finer level of resolution in repaired areas. Modification may be defined as sensor replacement or sensor additions. If modifications are not needed, then the initial structure signature or baseline signal may again be acquired and stored as in step 208, and the monitoring of the physical structure 12 may continue. If modifications are needed, then additional sensor wafers 16 may be installed as in step 228, and the SHM system must again be configured and calibrated as in step 206. Then the initial structure signature or baseline signal may again be acquired and stored as in step 208, and the monitoring of the physical structure 12 may continue.

Figure 6:
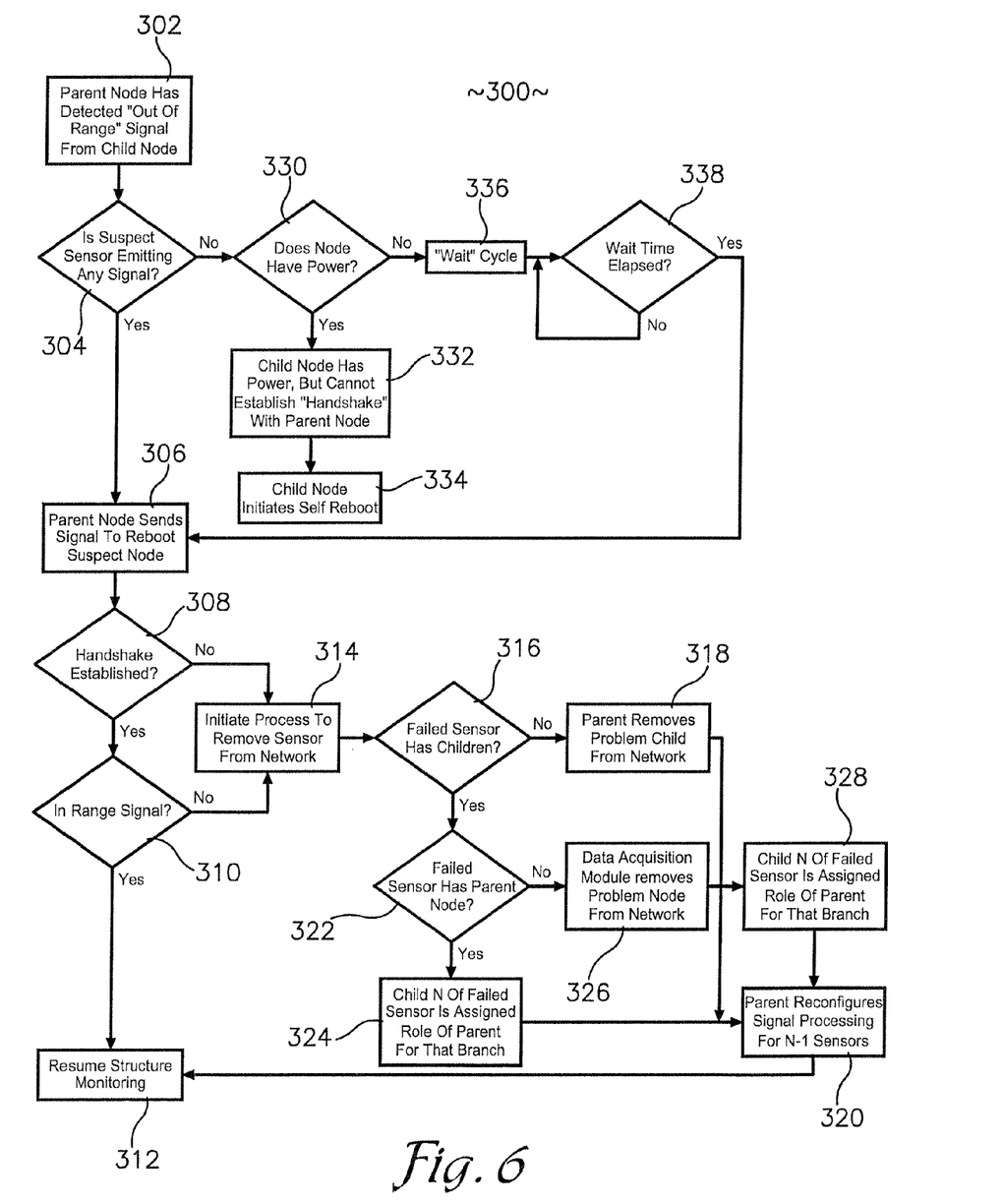
FIG. 6 is a flow chart illustrating a method of responding to sensor failure within the SHM system of FIG. 1.

Returning again to step 216, if the signal deviation is not consistent with structure damage, then method 300 illustrated in FIG. 6 may be followed. As depicted in step 302, the parent node and/or the central data acquisition module 14 may receive a signal from the child node outside of the acceptable range of deviation from the baseline signal. A signal may be out of the acceptable range or may not be received at all. Step 304 depicts the SHM system 10 determining if the signal is simply out of the range of acceptable deviation from the baseline or if the child node sensor wafer (the "suspect" sensor) is simply not emitting any signal. If the suspect sensor is emitting a signal, step 306 depicts the parent node sending a signal to reboot the suspect sensor.

Once the suspect sensor had been rebooted, the SHM system 10 determines if a "handshake" has been established, as depicted in step 308. Here, a handshake refers to the sensor wafers 16 and/or the central data acquisition module 14 exchanging signals to confirm that data is being properly transmitted and received between two of the sensor wafers 16 or between one of the sensor wafers 16 and the central data acquisition module 14. If the handshake is established, the SHM system 10 then determines if the signal is in the acceptable range of deviation from the baseline signal, as depicted in step 310. If the handshake is in the acceptable range of deviation from the baseline signal, monitoring of the physical structure 12 may resume, as depicted in step 312.

If either the handshake can not be established or the signal is not within the acceptable range of deviation from the baseline signal, then a process to remove the failed sensor wafer from the network may be initiated, as depicted in step 314. Step 316 depicts checking to see if the failed sensor wafer has any child nodes. If the failed sensor wafer has not child nodes, then the parent removes the problem node or failed sensor wafer from the network, as depicted in step 318. Removing the child node from the network if it has no child nodes of its own may simply result in the parent ignoring the malfunctioning child node. Then the parent node may reconfigure the signal processing for its remaining child sensor wafers, as depicted in step 320. For instance, if child node N is removed from the network or ignored by the network, the parent may reconfigure its signal processing for N–1 child node sensor wafers. Then the SHM system 10 may resume structure monitoring as depicted in step 312.

Returning again to step 316, if the failed sensor wafer does have children, then the SHM system 10 may determine if the failed sensor wafer also has a parent node, as depicted in step 322. If the failed sensor wafer has children and has a parent node, then the child N of the failed sensor wafer may be assigned the role of parent for that branch, as depicted in step 324. Then, as in step 320, the parent N, which was formally child N of the failed sensor wafer, may reconfigure its signal processing for N–1 child sensor wafers. Additionally, parent N may be reconfigured to communicate with the parent of the failed sensor wafer. Then, as depicted in step 312, the SHM system 10 may resume structure monitoring.

If the failed sensor wafer has children (determined in step 316), but the failed sensor wafer does not have a parent node (determined in step 322), then the central data acquisition module 14 is the parent of the failed sensor wafer and removes the problem node or failed sensor wafer from the network, as depicted in step 326. As depicted in step 328, the child N of the failed sensor wafer may then be assigned the role of the parent for that branch, such that the children of the failed sensor wafer will now communicate with child N as their parent node. Child N will therefore become paren N and will also then directly communicate with the central data acquisition module 14. Next, the parent N will reconfigure signal processing for N–1 sensors, as depicted in step 320, and then the SHM system 10 may resume structure monitoring, as in step 312.

Returning to the earlier step 304, if the suspect sensor is determined to not be emitting any signal, then the SHM system next determines if the suspect sensor has power, as depicted in step 330. If it the suspect sensor does not have power, as depicted in step 336, the SHM system may start a "wait" cycle to allow for the possibility that the aircraft has been out of service for a sufficient period of time that the suspect sensor has discharged. Therefore, the aircraft may be required to operate for a wait cycle, such as a 24 hour period, in an attempt to recharge the power source 32. As depicted in step 338, the SHM system 10 determines if the wait cycle time period has elapsed, and if it has, then the parent node of the suspect sensor sends a signal to the suspect sensor to reboot, as in step 306. Then the steps subsequent to step 306 may be followed, as described above and depicted in the flow chart of FIG. 6.

Returning to step 330, if the suspect sensor does have power, then the suspect sensor or child node has power, but cannot establish a handshake with the parent node, as in step 332. In this situation, the child node or suspect sensor may initiate a self reboot as in step 334. In various embodiments of the invention, step 308 may follow step 334.

Although the present technology has been described with reference to the preferred embodiments illustrated in the attached drawings, it is noted that equivalents may be employed and substitutions made herein without departing from the scope of the subject matter recited in the claims. For example the steps of methods 200 and 300 described herein may be performed in another sequence or with steps added or removed without departing from the scope of the invention.

Having thus described preferred implementations of the present technology, what is claimed as new and desired to be protected by Letters Patent includes the following:

1. A structural health monitoring (SHM) system for monitoring the structural health of a physical structure having at least one surface, the SHM system comprising:
   a central data acquisition module for sending and receiving wireless signals containing data associated with the structural health of a physical structure, the central data acquisition module comprising a processor and memory;
   a plurality of sensor wafers configured to be bonded to the surface of the physical structure and communicably coupled with each other and the central data acquisition module in a hierarchical manner, each sensor wafer comprising:
      a sensor for converting at least one of mechanical or thermal energy into an electrical signal, and
      circuitry for receiving and routing data signals between the sensor and other designated ones of the sensor wafers or the central data acquisition module,
   wherein at least one of the wireless antenna and a plurality of circuitry traces is direct write (DW) deposited onto a carbon fiber ply.

2. The SHM system of claim 1, wherein the memory of the central data acquisition module stores mapping data regarding the hierarchical order in which the sensor wafers communicate with each other and with the central data acquisition module, such that each sensor communicates with designated ones of the sensor wafers.

3. The SHM system of claim 1, wherein the processor analyzes the signals received by the sensor wafers and reconfigures the mapping data within the memory if at least one of the sensor wafers is malfunctioning.

4. The SHM system of claim 3, wherein the processor reconfigures the mapping data to exclude any malfunctioning sensor wafer from the hierarchical order and to command at least some of the other sensor wafers to monitor a portion of the at least one surface previously monitored by the malfunctioning sensor wafer.

5. The SHM system of claim 1, wherein each of the sensor wafers further comprise:
   a wireless antenna, and
   a power source for providing power for operating the circuitry.

6. The SHM system of claim 1, wherein the physical structure is a composite part and the sensor wafers are bonded to the composite part during or after curing of the composite part.

7. The SHM system of claim 1, wherein the sensor wafers are covered with an epoxy-based protective coating.

8. The SHM system of claim 1, wherein the data signals may comprise information regarding at least one of a type of signal detected, a significant change in the signal detected, what sensor wafer the signal originated from, and a time at which a structural fault was detected.

9. A structural health monitoring (SHM) system for monitoring the structural health of a physical structure having at least one surface, the SHM system comprising:
   a central data acquisition module for sending and receiving wireless signals containing data associated with the structural health of a physical structure, the central data acquisition module comprising a processor and memory;
   a plurality of self-contained sensor wafers configured to be bonded to the surface of the physical structure and wirelessly communicably coupled hierarchically with each other and the central data acquisition module, each sensor wafer comprising:
      a sensor for converting at least one of mechanical and thermal energy into an electrical signal,
      circuitry for receiving and routing data signals between the sensor and the other sensor wafers or the central data acquisition module, and
      a wireless antenna direct write (DW) deposited onto at least one of a carbon fiber ply and a fiberglass ply,
   wherein the memory of the central data acquisition module stores mapping data regarding the hierarchical order in which the sensor wafers communicate with each other and with the central data acquisition module.

10. The SHM system of claim 9, wherein the processor analyzes the signals received by the sensor wafers and reconfigures the mapping data within the memory if at least one of the sensor wafers is malfunctioning.

11. The SHM system of claim 10, wherein the processor reconfigures the mapping data to exclude any malfunctioning sensor wafer from the hierarchical order and to command at least some of the other sensor wafers to monitor a portion of the at least one surface previously monitored by the malfunctioning sensor wafer.

12. The SHM system of claim 9, wherein the physical structure is a composite part and the sensor wafers are bonded to the composite part during or after curing of the composite part.

13. The SHM system of claim 9, wherein the sensor wafers are covered with an epoxy-based protective coating.

14. The SHM system of claim 9, further comprising a power source for providing power for operating the circuitry.

15. The SHM system of claim 14, wherein the power source is a power harvesting source that converts vibrations into electrical energy.

16. The SHM system of claim 9, wherein the SHM system is configured to reconfigure the mapping data within the memory if additional sensor wafers are added to the SHM system.

* * * * *